US008303077B2

(12) United States Patent
Tanaka et al.

(10) Patent No.: US 8,303,077 B2
(45) Date of Patent: Nov. 6, 2012

(54) IMAGE FORMING APPARATUS EMPLOYING CARRIAGE WITH IMAGE FORMING UNIT MOUNTED THEREON

(75) Inventors: Akiyoshi Tanaka, Fujisawa (JP); Yoichi Ito, Tokyo (JP); Tsuguyori Kemma, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 314 days.

(21) Appl. No.: 12/508,722

(22) Filed: Jul. 24, 2009

(65) Prior Publication Data

US 2010/0026758 A1 Feb. 4, 2010

(30) Foreign Application Priority Data

Jul. 29, 2008 (JP) ................................ 2008-194315
Feb. 24, 2009 (JP) ................................ 2009-041467

(51) Int. Cl.
*G06F 15/00* (2006.01)

(52) U.S. Cl. ........................................................ 347/32

(58) Field of Classification Search ........................ None
See application file for complete search history.

(56) References Cited

U.S. PATENT DOCUMENTS 5,281,978 A * 1/1994 Kojima et al. ................ 347/257
6,139,205 A * 10/2000 Suzuki et al. ................... 400/76
7,086,281 B2 * 8/2006 Tsukada et al. ............. 73/290 V
7,344,224 B2 * 3/2008 Ishii et al. ....................... 347/37
7,434,927 B2 10/2008 Sakuma et al.
2006/0164491 A1 7/2006 Sakuma et al.
2007/0109385 A1 5/2007 Imoto et al.
2009/0058911 A1 3/2009 Kogure et al.
2009/0102907 A1 * 4/2009 Yamanaka et al. .............. 347/94
2009/0174749 A1 7/2009 Kemma

FOREIGN PATENT DOCUMENTS

JP 63-53086 3/1988
JP 11-125789 5/1999
JP 2003-237165 8/2003
JP 2005-81673 3/2005
JP 2005-178024 7/2005
JP 2005-212160 8/2005
JP 2005-349792 12/2005
JP 2006-192624 7/2006

OTHER PUBLICATIONS

Jan. 20, 2011 Chinese official action in connection with a counterpart Chinese patent application.

* cited by examiner

*Primary Examiner* — Matthew Luu
*Assistant Examiner* — Alejandro Valencia
(74) *Attorney, Agent, or Firm* — Cooper & Dunham LLP

(57) ABSTRACT

An image forming apparatus includes a carriage, an image forming unit, a storage unit, a vibration absorber, and a controller. The carriage reciprocally moves in a main scan direction. The image forming unit is mounted on the carriage. The storage unit stores a speed profile of the carriage. The vibration absorber has controllable vibration reduction characteristics to reduce vibration. The controller controls the vibration reduction characteristics of the vibration absorber in accordance with the speed profile.

19 Claims, 12 Drawing Sheets

IMAGE FORMING APPARATUS EMPLOYING CARRIAGE WITH IMAGE FORMING UNIT MOUNTED THEREON

CROSS-REFERENCE TO RELATED APPLICATIONS

The present patent application claims priority pursuant to 35 U.S.C. §119 from Japanese Patent Application Nos. 2008-194315, filed on Jul. 29, 2008, and 2009-041467, filed on Feb. 24, 2009 in the Japan Patent Office, each of which is hereby incorporated herein by reference in its entirety.

BACKGROUND

1. Technical Field

Illustrative embodiments of this disclosure relate to an image forming apparatus employing a reciprocally movable carriage with an image forming unit mounted thereon.

2. Description of the Background

An image forming apparatus is an apparatus used as a printer, a facsimile machine, a copier, a plotter, or a multi-functional peripheral (MFP) having several of the foregoing capabilities. One known conventional image forming apparatus employing a liquid-ejection recording method is an inkjet recording apparatus, which ejects liquid droplets from a recording head onto a recording sheet to form a desired image.

Inkjet-type image forming apparatuses fall into two main types: a serial-type image forming apparatus that forms an image by ejecting droplets while moving a recording head in a main scan direction, and a line-head-type image forming apparatus that forms an image by ejecting droplets from a recording head fixedly disposed in the image forming apparatus.

One conventional serial-type image forming apparatus has a carriage on which a liquid ejection head serving as an image forming unit is mounted. To form an image, the apparatus ejects droplets from the liquid ejection head while moving the liquid ejection head in the main scan direction to scan a sheet and intermittingly shifting the sheet in a sub-scanning direction perpendicular to the main scan direction.

However, in the conventional serial-type image forming apparatus, as the carriage reciprocally moves back and forth, the image forming apparatus vibrates. In particular, when the carriage speed is increased to enhance the print speed, the acceleration and deceleration speeds in the main scanning of the carriage are also increased, causing further vibration of the image forming apparatus. Alternatively, in a MFP including an image reading apparatus (also typically known as a scanner), such vibration at the printer side may be transmitted to the scanner during scanning, thereby degrading a resultant scanned image.

In light of the above-described situation, several techniques have been proposed to reduce or suppress vibration of the carriage. In one conventional technique, a vibration absorption member is provided between a carriage driving unit and the apparatus body frame to reduce the transmission of vibration, which is caused by reciprocal movement of a carriage, to the body frame.

In another conventional technique, the strength of impact against a body of a printer is detected, and an adjustable vibration absorption means of a printer-supporting unit is controlled in response to the detected impact.

In such a serial-type image forming apparatus, when an image is formed by ejecting droplets from the recording head while reciprocally moving the carriage back and forth, it is preferable that a guide member (carriage-support member) movably supporting the carriage is fixedly held by the body frame of the image forming apparatus with relatively high rigidity to reduce vibration of the carriage and enhance the accuracy of landing positions of the droplets on the recording medium sheet.

However, as with the above-described conventional serial-type image forming apparatus, when the carriage driving unit is mounted on the body frame via, for example, a rubber member serving as a vibration absorption member, the carriage is constantly held by a vibrating member such as the rubber member, thus degrading image quality.

Alternatively, the above-described technique in which the vibration absorption means of the printer support unit is adjusted in response to a detected impact may result in a relatively complicated configuration, posing production and cost challenges.

BRIEF SUMMARY

In an aspect of this disclosure, there is provided an image forming apparatus with a relatively simple configuration capable of suppressing the transmission of vibration caused by reciprocating movement of an image forming apparatus carriage to a body of the image forming apparatus.

In another aspect, an image forming apparatus includes a carriage, an image forming unit, a storage unit, a vibration absorber, and a controller. The carriage moves reciprocally in a main scan direction. The image forming unit is mounted on the carriage. The storage unit stores a speed profile of the carriage. The vibration absorber has controllable vibration reduction characteristics to reduce vibration. The controller controls the vibration reduction characteristics of the vibration absorber in accordance with the speed profile.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein.

Figure 1:
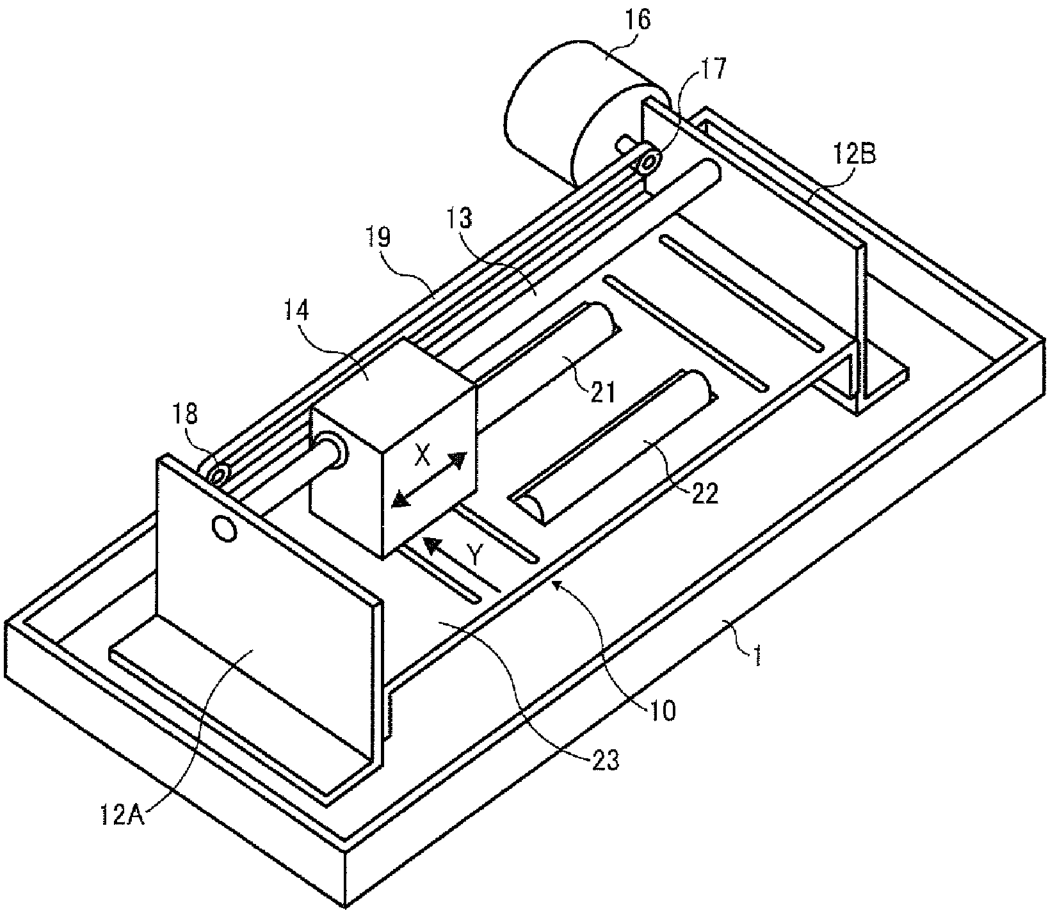
FIG. 1 is a perspective view illustrating a print mechanism section of an image forming apparatus according to a first illustrative embodiment.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

For example, the term "sheet" used herein refers to a medium, a recording medium, a recorded medium, a sheet material, a transfer material, a recording sheet, a paper sheet, or the like. The sheet may also be made of material such as paper, string, fiber, cloth, leather, metal, plastic, glass, timber, and ceramic. Further, the term "image formation" used herein refers to providing, recording, printing, or imaging an image, a letter, a figure, a pattern, or the like onto the sheet. Moreover, the term "liquid" used herein is not limited to recording liquid or ink, and may include anything ejected in the form of a fluid, such as DNA samples, resist, pattern material, washing fluid, storing solution, fixing solution. Hereinafter, such liquid may be simply referred to as "ink".

Although the illustrative embodiments are described with technical limitations with reference to the attached drawings, such description is not intended to limit the scope of the present invention and all of the components or elements described in the illustrative embodiments of this disclosure are not necessarily indispensable to the present invention.

Below, illustrative embodiments according to the present invention are described with reference to attached drawings.

Figure 2:
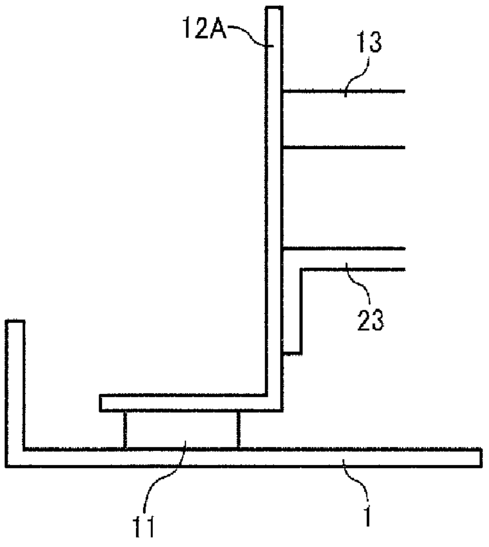
FIG. 2 is a front view illustrating a support portion of the print mechanism section illustrated in FIG. 1.

A first illustrative embodiment is described with reference to FIGS. 1 and 2. FIG. 1 is a perspective view illustrating a print mechanism section 10 of an image forming apparatus according to the present illustrative embodiment. FIG. 2 is a front view illustrating a support portion of the print mechanism section 10.

The image forming apparatus is a serial-type image forming apparatus in which the print mechanism section 10 is supported on a base member (hereinafter, "body base member") 1 of an apparatus body of the image forming apparatus. The print mechanism section 10 includes side plates 12A and 123 (hereinafter, referred to collectively as "side plates 12" unless specifically distinguished). The side plates 12 are mounted on the body base member 1 via vibration absorbers 11 whose vibration reduction characteristics can be adjusted as necessary.

A guide rod 13 and a slide rail, not illustrated, are extended between the side plates 12 serving as guide-support members. The guide rod 13 serving as a guide member (a carriage-support member) and the slide rail slidably support a carriage 14 on which a recording head serving as an image forming unit is mounted. A main scan motor 16 causes the carriage 14 to move reciprocally along a main scan direction (indicated by a double arrow X in FIG. 1) via a driving pulley 17, a driven pulley 18, and a timing belt 19.

Below the carriage 14 is disposed a conveyance guide member 23 that holds conveyance rollers 21 and 22 serving as conveyance units to convey a sheet in a sub-scanning direction indicated by an arrow Y in FIG. 1. End portions of the conveyance guide member 23 are fixed on the side plates 12A and 12B.

The image forming apparatus further includes, for example, a sheet feed unit to feed a sheet to the conveyance roller 21 and a sheet output unit to output a sheet on which an image has been formed.

The vibration reduction characteristics of the vibration absorbers 11 are switched between at least two states, that is, a state capable of performing vibration absorption function and a state incapable of performing vibration absorption function, by either the introduction thereinto of a fluid under pressure, such as air or oil, or by switching the polarities of a magnet attached thereto.

Figure 3A:
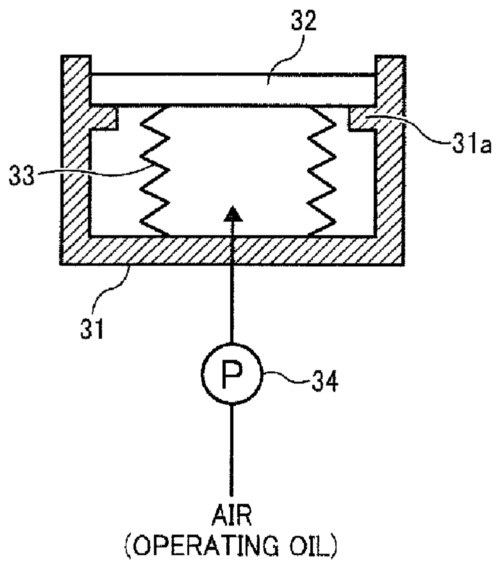
FIGS. 3A and 3B are schematic diagrams illustrating an example of a vibration absorber.

For example, as illustrated in FIG. 3A, a movable base member 32 is slidably fitted in an opening portion of a case member 31. The case member 31 includes an elastic member 33 that is expanded and contracted by a pump 34 moving air or operating oil into and out of a space between the movable base member 32 and the case member 31. In such a case, for example, the case member 31 is fixed on the body base member 1 while the side plates 12 are fixed on the movable base member 32.

Figure 3B:
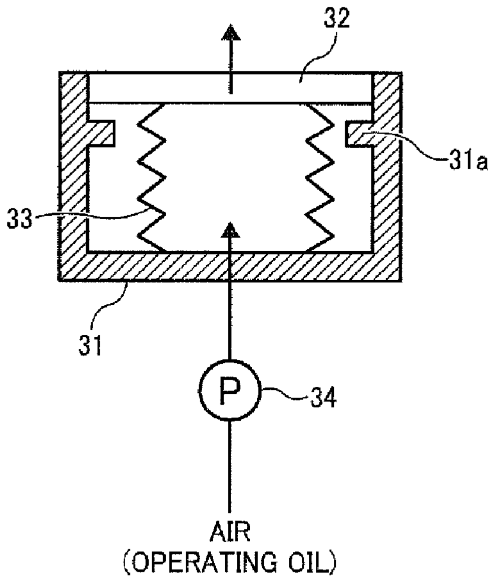

In the state illustrated in FIG. 3A, the movable base member 32 is supported by stopper portions 31*a* of the case member 31. In this state, by supplying air or oil pressure into the elastic member 33, the movable base member 32 is separated from the stopper portions 31*a* to rise in a direction indicated by an arrow in FIG. 3B. As described above, the movable base member 32 is supported by the elastic member 33, allowing absorption of vibration transmitted from the side plates 12 to the movable base member 32 by the elastic member 33.

Figure 4A:
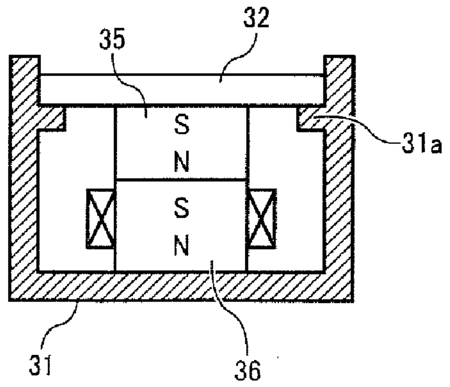
FIGS. 4A and 4B are schematic diagrams illustrating another example of the vibration absorber.

Alternatively, as illustrated in FIG. 4A, the movable base member 32 may be slidably fitted in the opening portion of the case member 31 so that a magnet 35 and an electromagnet 36 may be fixed on the movable base member 32 and the case member 31, respectively. In such a case, for example, the case member 31 is fixed on the body base member 1 while the movable base member 32 is fixed on the side plates 12.

Figure 4B:
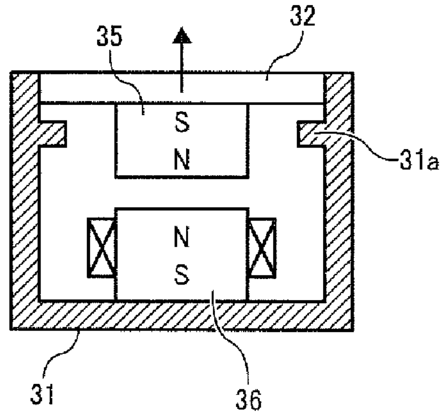

In the state illustrated in FIG. 4A, for example, when electric power is supplied to the electromagnet 36 so that the polarities of the magnet 35 and the electromagnet 36 attract each other, the movable base member 32 is supported by the stopper portions 31*a* of the case member 31. In this state, by supplying electric power to the electromagnet 36 so that the electromagnet 36 is repulsed from the magnet 35, the movable base member 32 is separated from the stopper portions 31*a* to rise in a direction indicated by an arrow illustrated in FIG. 4B. As a result, the movable base member 32 is floated above the electromagnet 36, allowing absorption of vibration transmitted from the side plates 12 to the movable base member 32 by a repulsive force acting between the magnet 35 and the electromagnet 36.

Figure 5:
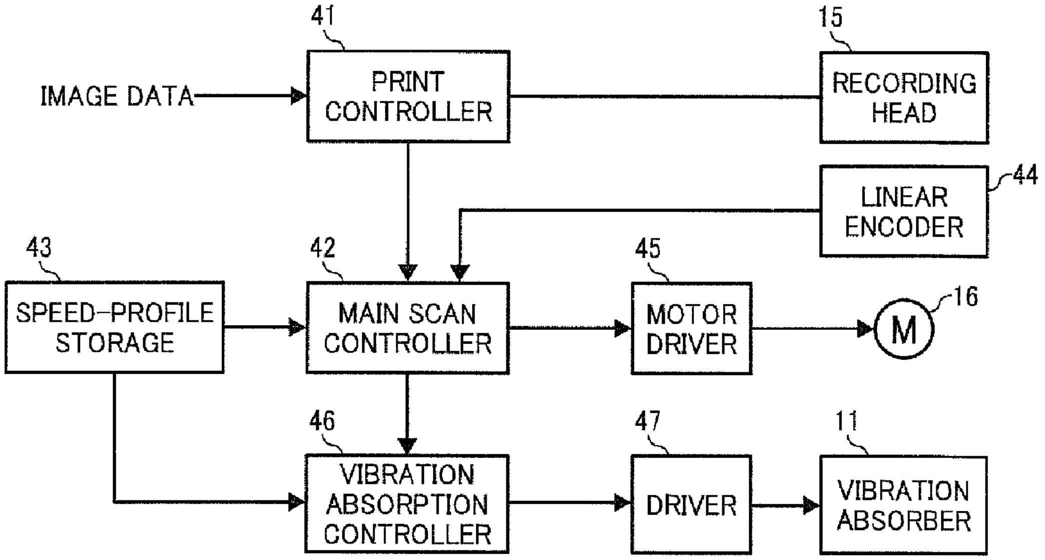
FIG. 5 is a functional block diagram illustrating a control unit that controls a vibration absorber.

Next, a control unit controlling the vibration absorbers 11 is described with reference to a block diagram shown in FIG. 5.

Figure 6:
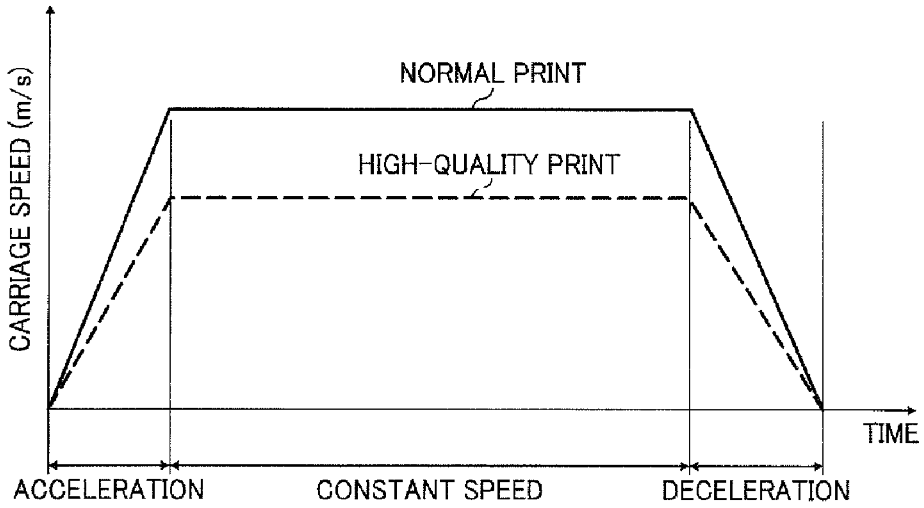
FIG. 6 is a graph illustrating an example of a speed profile of a carriage.

On receiving image data from an external information processing apparatus, such as a personal computer, a print controller 41 controls a recording head 15 in accordance with the received image data to eject liquid droplets. In response to a speed profile of the carriage 14, as illustrated in FIG. 6, stored in a speed-profile storage unit 43 and an output signal from a linear encoder 44 that detects a position of the carriage 14 in the main scan direction, a main scan controller 42 calculates a control amount (e.g., a PI control value) using deviation of the current speed from a target speed. The main scan controller 42 also controls a main scan motor 16 via a motor driver 45 so as to move the carriage 14 at a desired carriage speed in the main scan direction.

When the carriage 14 is moved in the main scan direction by the main scan controller 42, a vibration absorption controller 46 adjusts the vibration reduction characteristics of the vibration absorbers 11 in accordance with the speed profile of the carriage 14 stored in the speed-profile storage unit 43. For example, during acceleration and deceleration of the carriage, the vibration absorption controller 46 controls the vibration absorbers 11 via a driver 47 so that the vibration absorbers 11 are activated, that is, put into the state capable of absorbing vibration. By contrast, when the carriage is moving at a constant speed, the vibration absorption controller 46 controls the vibration absorbers 11 via the driver 47 so that the vibration absorbers 11 are inactivated, that is, put into the state incapable of absorbing vibration.

Figure 7:
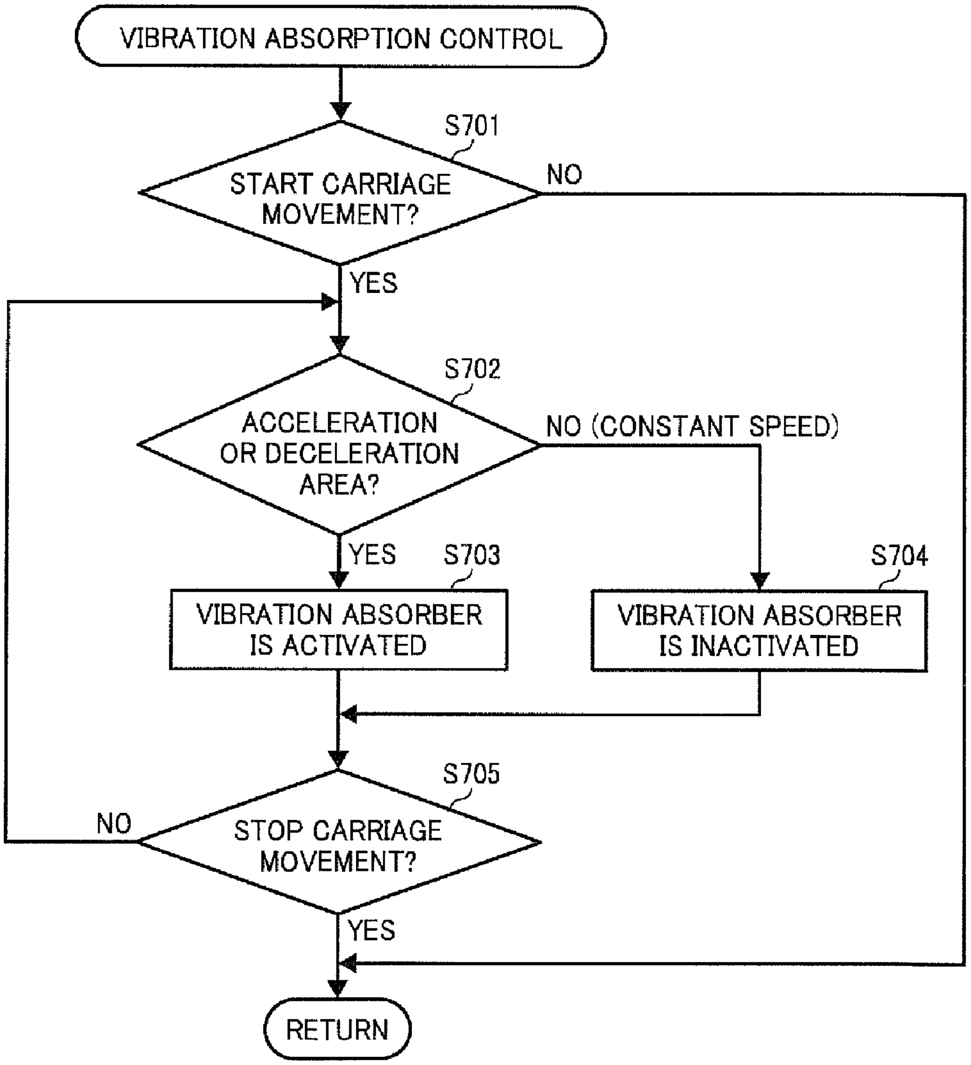
FIG. 7 is a flow chart illustrating vibration absorption control performed by a vibration absorption controller according to the first illustrative embodiment.

Next, one example of such vibration absorption control of the vibration absorption controller 46 is described with reference to a flow chart shown in FIG. 7.

When the carriage 14 starts to move ("YES" at S701), the vibration absorption controller 46 determines whether or not the moving speed of the carriage 14 is within either an acceleration area or a deceleration area of the speed profile at S702. If the speed of the carriage 14 is within either an acceleration or deceleration area ("YES" at S702), at S703 the vibration absorption controller 46 causes the vibration absorbers 11 to turn into the state capable of absorbing vibration (an active state of the vibration absorber 11). By contrast, if the speed of the carriage 14 is outside the acceleration and deceleration area, i.e., within a constant-speed area ("NO" at S702), at S704 the vibration absorption controller 46 causes the vibration absorbers 11 to turn into the state incapable of absorbing vibration (an inactive state of the vibration absorber 11).

Thus, when the carriage 14 moves in the main scan direction for scanning, in the acceleration and deceleration areas of the carriage speed, the print mechanism section 10 is supported on the body base member 1 with the vibration absorbers 11 in the active state capable of absorbing vibration. By contrast, in the constant-speed area of the carriage speed, the print mechanism section 10 is supported on the body base member 1 with the vibration absorbers 11 incapable of absorbing vibration. In the inactive state, the print mechanism section 10 is fixedly supported on the body base member 1.

It is to be noted that when the carriage 14 moves in the main scan direction for scanning, vibration of the apparatus body of the image forming apparatus is caused by the inertial force arising in accelerating or decelerating the carriage 14. Such acceleration, deceleration, and constant-speed areas are specified by the speed profile.

Hence, in the acceleration and deceleration areas obtained from the speed profile, the print mechanism section 10 is supported on the body base member 1 with the vibration absorption function of the vibration absorbers 11 activated, thus preventing vibration of the apparatus body.

By contrast, as image formation is performed by ejecting liquid droplets from the recording head 15 in the constant-speed area of the carriage 14, during the image formation, the print mechanism section 10 is fixedly supported on the body base member 1 with the vibration absorption function of the vibration absorbers 11 inactivated, thus suppressing vibration of the carriage 14 and preventing reduced accuracy of landing positions of droplets on a sheet, which might be otherwise caused by vibration of the entire print mechanism section 10.

Thus, adjusting the vibration reduction characteristics of the vibration absorber 11 in accordance with the speed profile of the carriage 14 can obviate the need for a detector for detecting an amount of vibration caused by the movement of the carriage 14, prevent such vibration caused by the reciprocating movement of the carriage 14 from being transmitted to the apparatus body of the image forming apparatus with a relatively simple configuration, and inactivate vibration absorption when the vibration absorption function causes an adverse effect.

In the above-described example, vibration absorption is performed in both the acceleration and deceleration areas. However, it is to be noted that such vibration absorption may be performed during only either acceleration or deceleration of the carriage 14.

Next, another illustrative embodiment that controls a vibration absorber in accordance with a print mode is described with reference to FIG. 8.

As illustrated in FIG. 6, in general, print speed and print quality (image quality) are inversely related. Thus, the above-described image forming apparatus may employ, for example, a normal print (draft) mode with which print operation is performed while moving a carriage at a relatively high (fast) speed and a high-quality print mode with which print operation is performed while moving the carriage at a relatively low (slow) speed as compared to the normal print mode.

In such a case, as illustrated in FIG. 6, the carriage-speed profile differs between those print modes. For example, in the high-quality print mode (low print speed), the carriage is moved at a relatively low speed. By contrast, in the normal-quality print mode (high print speed), the carriage is moved at a relatively high speed. Accordingly, the acceleration and deceleration speeds of the carriage 14 differ between those print modes.

Figure 8:
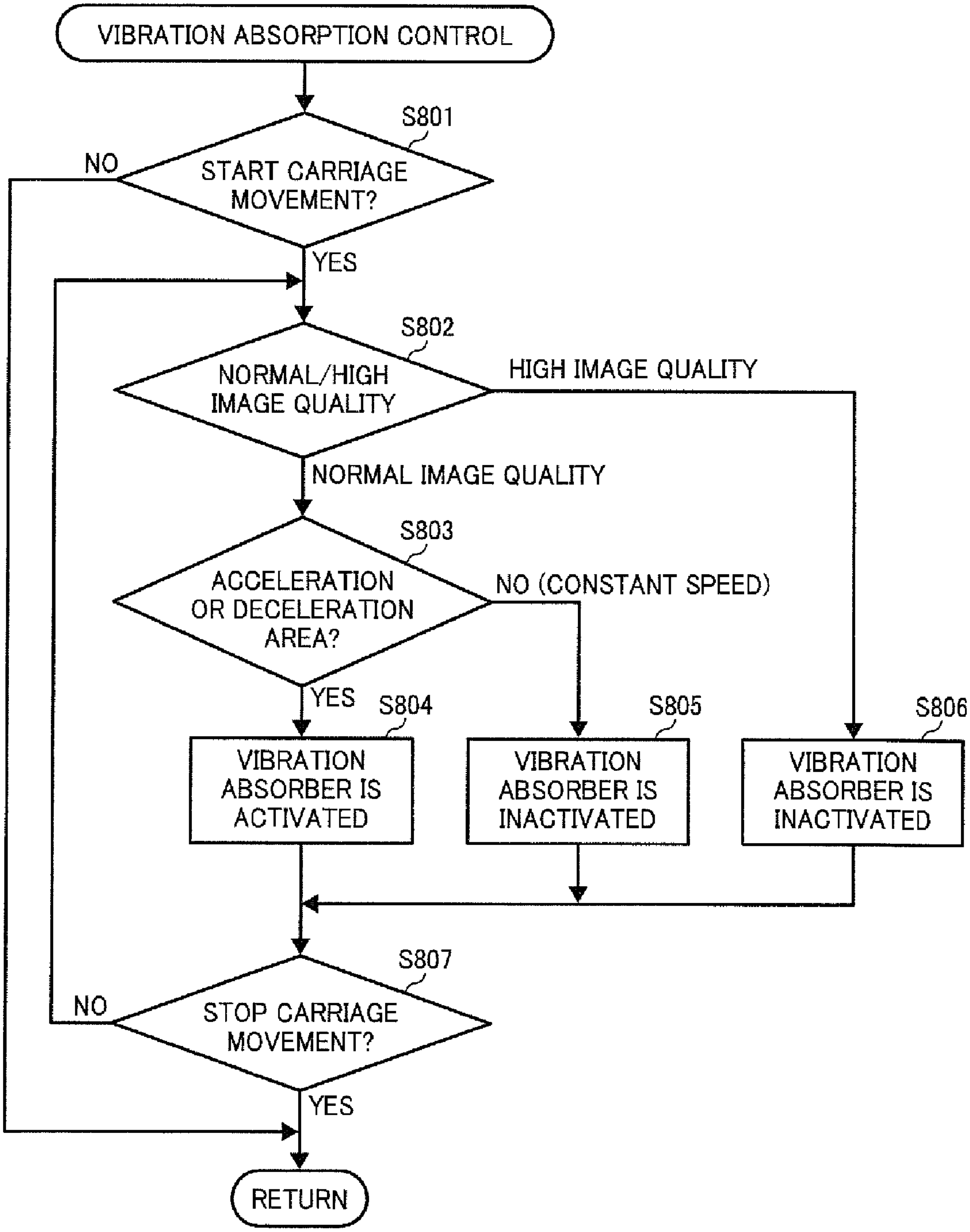
FIG. 8 is a flow chart illustrating vibration absorption control performed by a vibration absorption controller according to a second illustrative embodiment.

Hence, as illustrated in FIG. 8, in the acceleration and deceleration areas of the normal print mode ("YES" at S803), at S804 the vibration absorption controller 46 activates the vibration reduction function of the vibration absorbers 11 in accordance with the carriage speed profile as in the case of the above-described first illustrative embodiment. By contrast, in the constant-speed area ("NO" at S803), at S805 the vibration absorption controller 46 inactivates the vibration reduction function of the vibration absorbers 11. Alternatively, in the high-quality print mode ("NO" at S802), at S806 the vibration absorption controller 46 inactivates the vibration reduction function of the vibration absorber 11 during movement of the carriage 14 including the acceleration and deceleration areas.

In the draft print mode in which the carriage speed is relatively fast and vibration in acceleration and deceleration is more likely to arise, the vibration absorbers 11 are controlled to perform the vibration absorption function as described above. By contrast, in the high-image-quality mode in which the carriage speed is relatively slow and vibration in acceleration and deceleration is less likely to arise, the vibration absorber 11 is controlled so as not to perform the vibration absorption function as described above.

Such adjustment of the vibration absorption characteristics of the vibration absorbers in accordance with a print mode provides efficient and effective control of the vibration reduction function.

Figure 9:
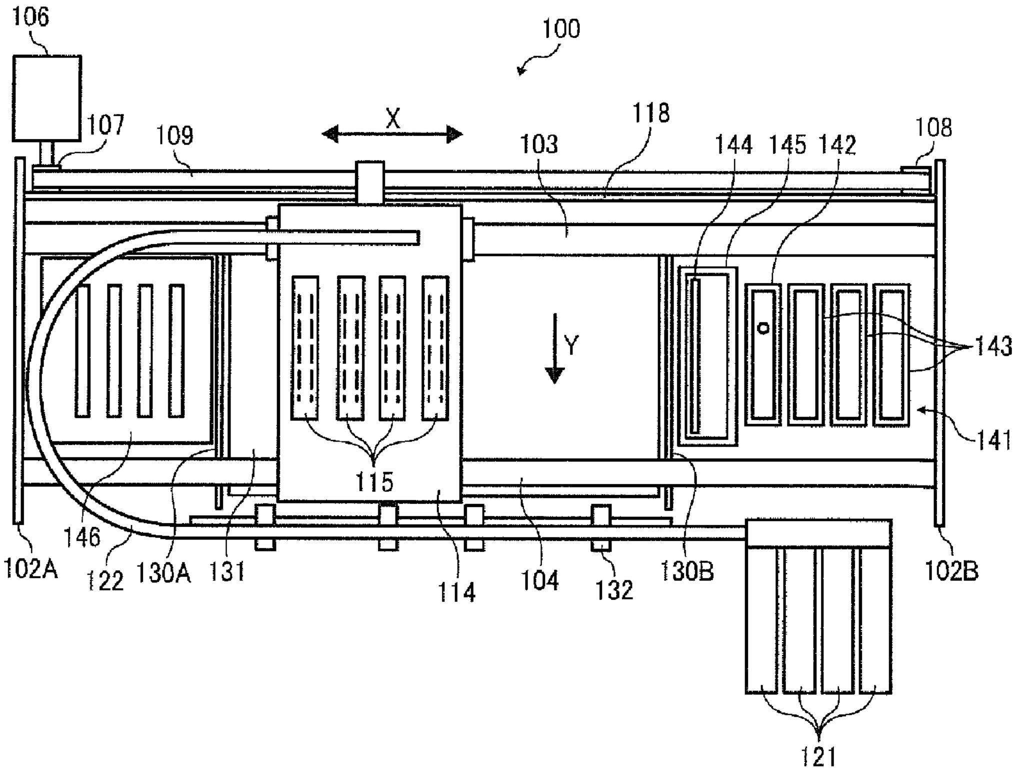
FIG. 9 is a plan view illustrating a portion of a print mechanism section of an image forming apparatus according to a third illustrative embodiment.
Figure 10:
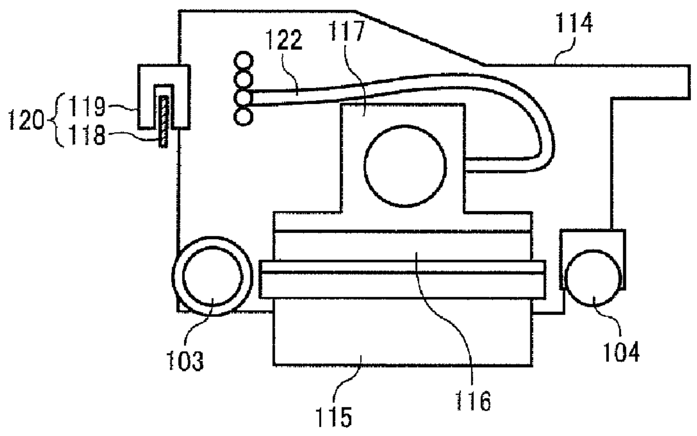
FIG. 10 is a side view illustrating a carriage of the print mechanism section illustrated in FIG. 9.

Next, a third illustrative embodiment is described with reference to FIGS. 9 and 10. FIG. 9 is a plan view illustrating a print mechanism section 100 of an image forming apparatus according to the present illustrative embodiment. FIG. 10 is a side view illustrating a carriage 114.

In the present embodiment as well, the image forming apparatus is also a serial-type image forming apparatus, and the print mechanism section 100 has left and right side plates 102A and 102B (hereinafter referred to collectively as "side plates 102" unless specifically distinguished) supported on a body base member (not illustrated) via vibration absorbers in a manner similar to, if not the same as, the first illustrative embodiment described above. A main guide rod 103 and a sub guide rod 104 serving as guide members (carriage-support members) are extended between the side plates 102A and 102B serving as guide-support members. The carriage 114 is supported by the main guide rod 103 and the sub guide rod 104 so as to slide in a main scan direction indicated by a double arrow X in FIG. 9. On the carriage 114 are mounted recording heads serving as image forming units to eject liquid droplets. The carriage 114 is moved in the main scan direction for scanning via a driving pulley 107, a driven pulley 108, and a timing belt 109.

In FIG. 9, on the carriage 114 are mounted four recording heads 115, which are liquid ejection heads serving as image forming units to eject ink droplets of yellow (Y), cyan (C), magenta (M), and black (K) colors, and sub tanks 117 that supply four color inks to the recording heads 115 via refill units 116. Each of the recording heads 115 is mounted on the carriage 114 so that a nozzle array consisting of a plurality of nozzle orifices is arranged along a sub-scan direction perpendicular to the main scan direction and ink droplets are ejected downward from the nozzle orifices.

An encoder scale 118 is provided along the main scan direction of the carriage 114. On the rear side of the carriage 114 is mounted an encoder sensor 119 serving as a transmission-type photosensor to read a scale (a position identification portion) of the encoder scale 118. The encoder scale 118 and the encoder sensor 119 forms a linear encoder 120, which corresponds to the above-described linear encoder 44, serving as a position detecting device.

To the sub tanks 117 of the carriage 114, ink is resupplied through a supply tube 122 from main tanks (ink cartridges) 121 for the respective colors. The main tanks 121 are detachably mounted in an apparatus body of the image forming apparatus.

Below the carriage 114 is provided a conveyance belt 131 serving as a conveyance unit to convey a sheet in the sub-scan direction. The conveyance belt 131 is an endless belt extended around a conveyance roller and a tension roller that are rotationally supported by sub-side plates 130A and 130B, and is circulated in the sub-scan direction indicated by an arrow Y in FIG. 9 in conjunction with the conveyance roller rotated by a sub-scan motor. On the downstream side of the conveyance belt 131 are provided sheet output rollers 132 to output a sheet on which an image has been formed. The image forming apparatus also includes a sheet feed unit, not illustrated, to feed a sheet to the conveyance belt 131.

In a non-image-forming area at one side of the main scan direction of the carriage 114 is provided a maintenance-and-recovery unit 141 to maintain and recover a preferred optimal operating condition of each recording head 115. The maintenance-and-recovery unit 141 includes, for example, suction caps 142 for sucking ink from the recording heads 115, moisture-retention caps 143 for keeping the nozzle surfaces of the recording heads 115 from drying out, a wiper blade 144 for wiping the nozzle surfaces, and a spittoon 145 for receiving droplets ejected for maintenance rather than for image formation.

Further, in the maintenance-and-recovery unit 141, a second spittoon 146 that receives droplets ejected for maintenance rather than image formation is provided in a non-image-formation area at the other side in the main scan direction of the carriage 114.

The image forming apparatus also drives the recording heads 115 in response to image signals while moving the carriage 114 in the main scan direction and intermittently conveying a sheet using the conveyance belt 131. Thus, the image forming apparatus ejects droplets onto the sheet halted to record one line of a desired image. After feeding the sheet by a certain amount, the image forming apparatus repeats the above-described operation to record another line. When the image formation is finished, the image forming apparatus outputs the sheet on which the desired image has been formed.

The amount of ink accommodated in each sub tank 117 is not constant, and ink is consumed for each print operation. Before the sub tank 117 runs out of ink, ink is resupplied from the main tank 121 to the sub tank 117. However, as a large difference in the mass of the sub tank 117 between the ink full state and the ink empty state influences the inertial force of the carriage 114, the vibration characteristics of the carriage 114 in acceleration and deceleration vary depending on the ink amount of the sub tank 117.

Figure 11:
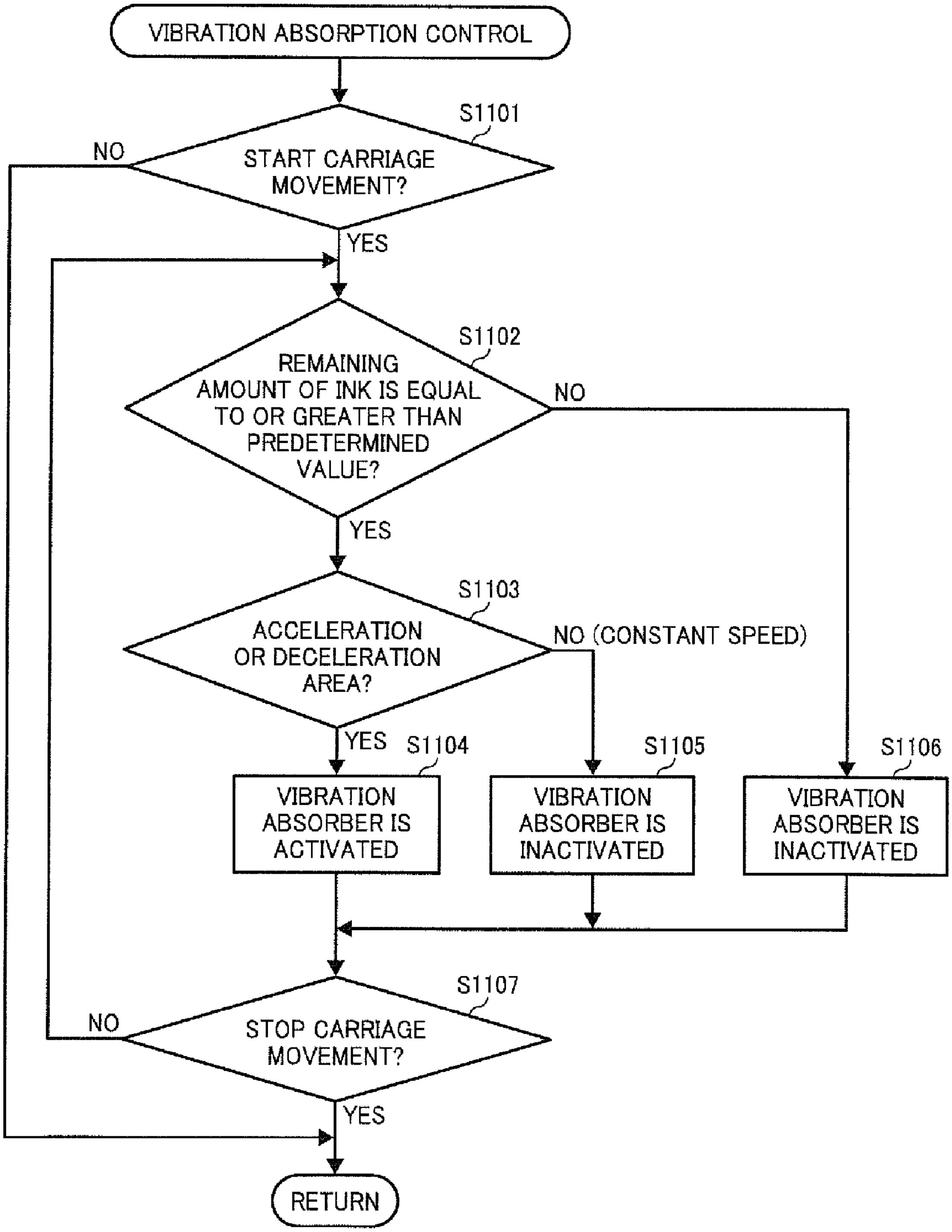
FIG. 11 is a flow chart illustrating vibration absorption control performed by a vibration absorption controller in the image forming apparatus according to the third illustrative embodiment.

Hence, in this image forming apparatus, as illustrated in FIG. 11, if the remaining ink mount of the sub tank 117 is equal to or greater than a predetermined value ("YES" at S1102), in acceleration and deceleration areas of the carriage speed profile ("YES" at S1103), at S1104 the vibration absorption controller 46 activates the vibration absorption function of the vibration absorber 11 in accordance with a speed profile of the carriage 114 as in the case with the first illustrative embodiment. By contrast, in a constant-speed area ("NO" at S1103), at S1105 the vibration absorption controller 46 inactivates the vibration absorption function of the vibration absorber 11. Alternatively, if the ink remaining amount of the sub tank 117 is less than the predetermined amount ("NO" at S1102), at S1106 the vibration absorption controller 46 inactivates the vibration absorption function of the vibration absorber 11.

As described above, by adjusting the vibration reduction characteristics of the vibration absorber in response to the amount of ink remaining in the sub tank 117, vibration absorption is effectively performed.

It is to be noted that the remaining ink amount of the sub tank 117 is obtained by estimating a consumed ink amount based on the number or amount of droplets ejected and then subtracting the consumed ink amount from a (predefined) full amount of ink accommodated in the sub tank 117.

In addition, as noted above, ink is supplied from the main tank 121 to the sub tank 117 via the supply tube 122, and the hardness of the supply tube 122, which varies depending on ambient conditions, is another factor to consider in controlling vibration. More specifically, the lower the temperature, the harder the supply tube 122, which significantly affects the acceleration and deceleration loads of the carriage 114 and the amount of vibration.

Hence, in the present illustrative embodiment, the image forming apparatus includes a temperature detector to detect an ambient temperature of the carriage 114 or an internal temperature of the image forming apparatus, and adjusts the vibration reduction characteristics of the vibration absorbers in response to the detected temperature, thus reducing or suppressing the vibration of the apparatus body in response to the fluctuation in the load of the carriage 114.

Figure 12:
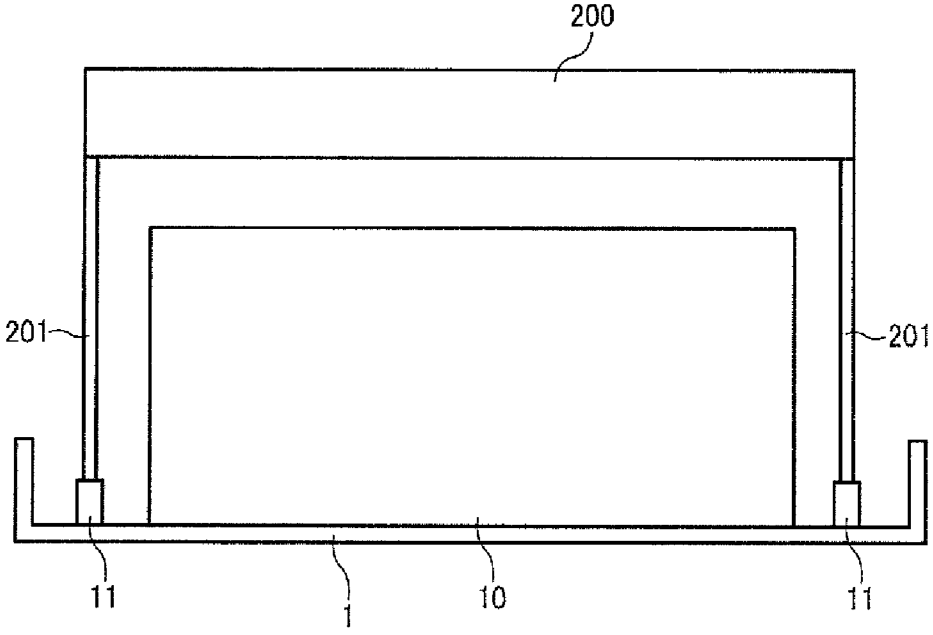
FIG. 12 is a schematic view illustrating a portion of an image forming apparatus according to a fourth illustrative embodiment.

Next, a fourth illustrative embodiment is described with reference to FIG. 12. FIG. 12 is a schematic view illustrating a portion of an image forming apparatus according to the fourth illustrative embodiment.

The image forming apparatus is configured as a multifunctional peripheral in which an image reading device (scanner) 200 is provided above a print mechanism section 10 serving as a plotter unit. The scanner 200 is supported on a body base member 1 via scanner-support frames 201, and vibration absorbers 11 are provided between the body base member 1 and each of the scanner-support frames 201.

The scanner 200 reads an image on a sheet (document) while automatically feeding the sheet. Accordingly, if the image forming apparatus vibrates, a reading carriage inside the scanner 200 is vibrated, degrading a resultant scanned image. In such a case, the scanning (reading) operation might be separated from the plot (recording) operation to stop the plot operation during the scanning operation (i.e., stop the scanning operation of the recording carriage of the plotter unit). However, such a configuration might significantly reduce productivity.

Hence, in the present illustrative embodiment, the vibration absorbers 11 are provided between the body base member 1 and each of the scanner-support frames 201. Thus, even if vibration is transmitted to the body base member 1, such a configuration prevents the vibration from being transmitted to the scanner 200, reducing or suppressing vibration of the scanner 200. As a result, the scanner 200 can read an image at a high-image quality during operation of the plotter unit, affording good productivity.

Further, this MFP-type image forming apparatus has a plurality of print (copy) modes, such as a high-quality mode in which the carriage speed is relatively low and a high-speed mode in which the carriage speed is relatively high, and adjusts the vibration absorption characteristics of the vibration absorber 11 in accordance with a selected copy mode (image quality). For example, during execution of serial copy, the reading carriage of the scanner 200 stops scanning. In such a case, transmission of vibration to the scanner 200 causes no scanning failure. Therefore, in response to the operation of the reading carriage of the scanner 200, the image forming apparatus determines whether the vibration absorption function of the vibration absorber 11 is activated or inactivated.

As the above-described switching control of the vibration absorption characteristics of the vibration absorbers 11 may pose a processing burden on the control unit, matters may be arranged so that such switching control may be performed only when required, or as a power-saving option. In addition, the image forming apparatus may be configured so as to allow a user to select whether the vibration suppression control is to be performed or not.

Figure 13:
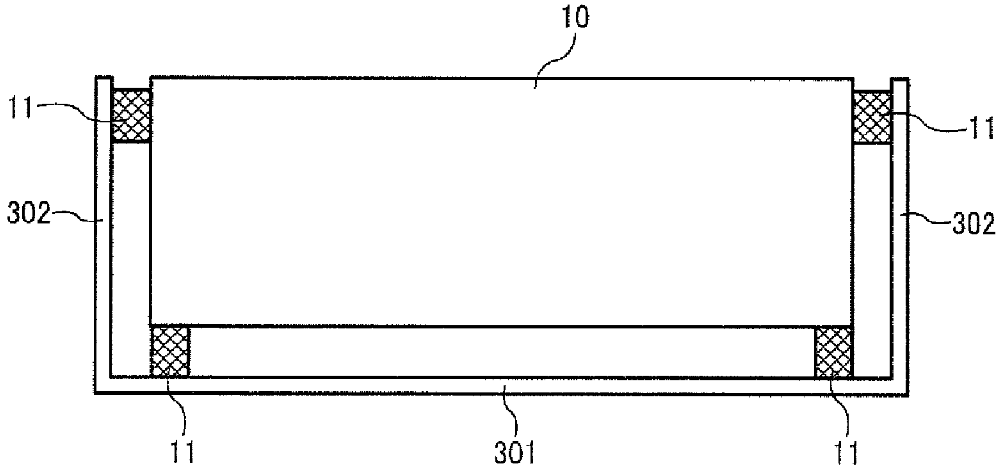
FIG. 13 is a schematic view illustrating a portion of an image forming apparatus according to a fifth illustrative embodiment.

Next, a fifth illustrative embodiment is described with reference to FIG. 13. FIG. 13 is a schematic view illustrating a portion of an image forming apparatus according to the fifth illustrative embodiment.

In the present illustrative embodiment, a body frame member of the image forming apparatus consists of a body base member 301 and main-side plates 302 standing at the right and left ends of the body base member 301. Vibration absorbers 11 are provided between a side plate of a print mechanism section 10 and the body base member 301 and between side plates of the print mechanism section 10 and the main side plates 302.

Such a configuration reduces or suppress vibration in both the vertical direction and the horizontal (i.e., main scan) direction of the print mechanism section 10.

Figure 14:
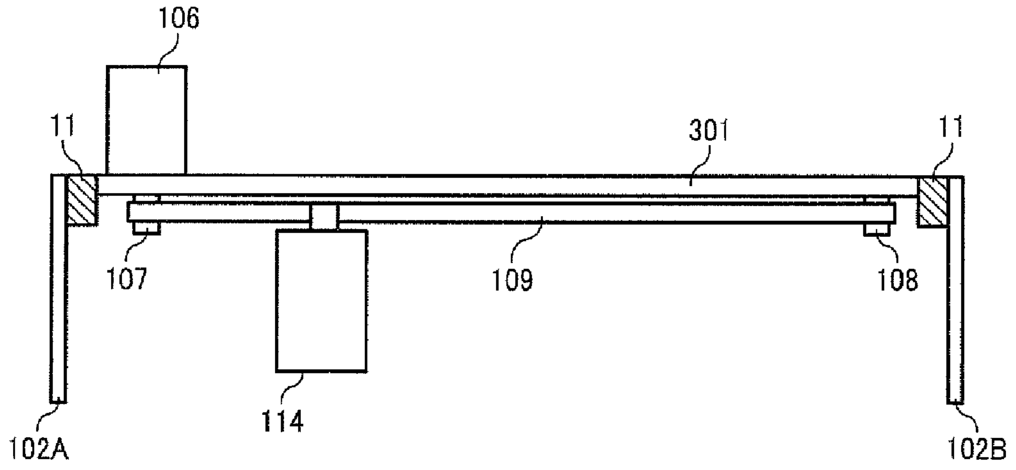
FIG. 14 is a schematic view illustrating a portion of an image forming apparatus according to a sixth illustrative embodiment.
Figure 15:
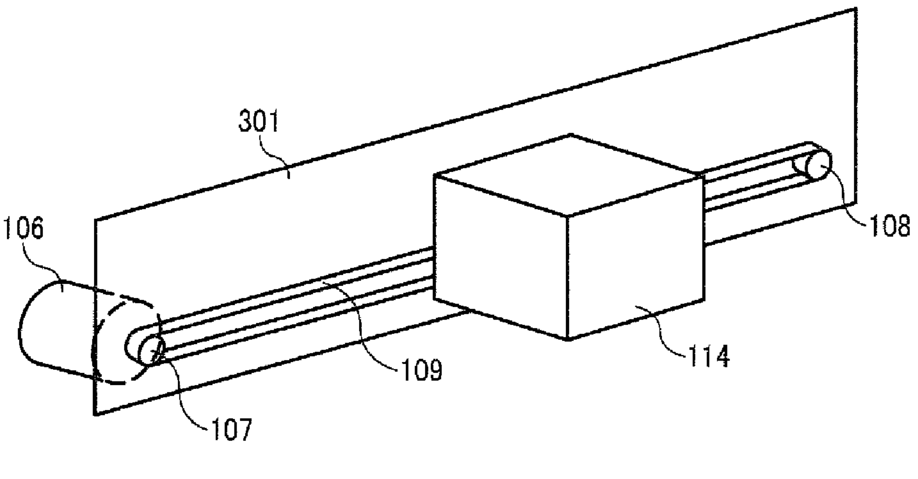
FIG. 15 is a perspective view illustrating the portion illustrated in FIG. 14.

Next, a sixth illustrative embodiment is described with reference to FIGS. 14 and 15. FIG. 14 is a plan view illustrating a portion of an image forming apparatus according to the sixth illustrative embodiment. FIG. 15 is a perspective view illustrating the portion illustrated in FIG. 14. In FIGS. 14 and 15, the same reference numerals are allocated to components similar to those shown in FIGS. 9 and 10.

In the present illustrative embodiment, a carriage-scan mechanism that moves a carriage 114 reciprocally for scanning in a main scan direction includes a main scan motor 106 serving as a carriage driving unit, a driving pulley 107, a driven pulley 108, a timing belt 109, and a carriage-scan support member 301. The carriage-scan support member 301 is supported by side plates 102A and 102B via the vibration absorbers 11.

In addition to providing the same effect as that of the first illustrative embodiment described above, such a configuration enables the size of the vibration absorbers to be reduced.

In the first illustrative embodiment, as the vibration absorbers support a portion including components involving the scanning of the carriage, the vibration absorbers may support a relatively large mass, which may result in an increased size and cost of the vibration absorbers. Further, the main scan motor is mounted on the body frame member, and the inertial force of the carriage is transmitted to the driving motor (main scan motor) via the timing belt. As a result, the inertial force of the carriage in acceleration and deceleration causes vibration of the image forming apparatus. Further, as the timing belt is extended around the driven pulley, which stretches the timing belt taut, and the driven pulley is mounted on the body frame member, vibration may be also transmitted to the frame member through the driven pulley.

Hence, in the present illustrative embodiment, a driving-force transmission mechanism for the main scanning of the carriage including the main scan motor, the driven pulley, and so on, is separated from the body frame member of the image forming apparatus, thus suppressing vibration of the body frame member caused by the inertial force of the carriage. Such a configuration provides a reduced mass of the driving-force transmission mechanism for the main scanning of the carriage and, as a result, a reduced size of the vibration absorbers.

Figure 16:
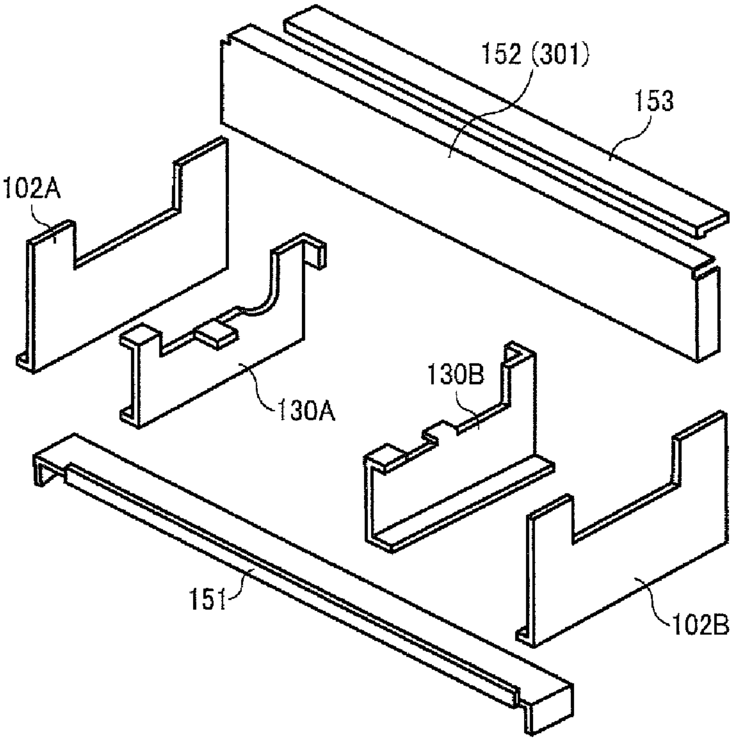
FIG. 16 is an exploded perspective view illustrating an example of the frame configuration of the image forming apparatus according to the sixth illustrative embodiment.

Next, one example of the configuration of a body frame of the image forming apparatus is described with reference to an exploded perspective diagram of FIG. 16.

In this configuration, the body frame consists of main-side plates 102A and 102B, sub-side plates 130A and 130B, a front stay 151, a rear stay 152, and a guide rail 153. An upper end portion of the carriage 114 is hooked on the guide rail 153 so that the carriage 114 slides on the guide rail 153. The rear stay 152 is provided between the main side plates 102A and 102B via the vibration absorbers 11.

Figure 17:
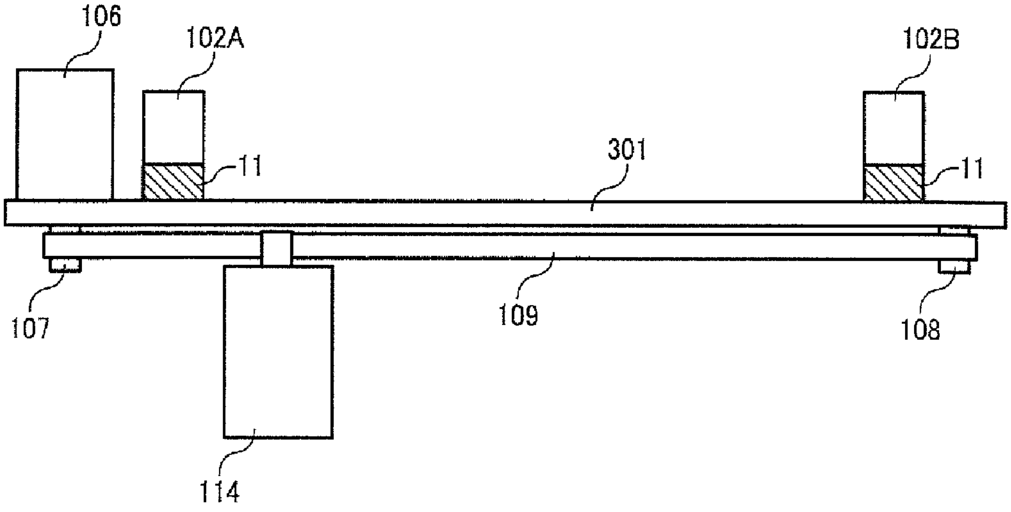
FIG. 17 is a schematic plan view illustrating a portion of an image forming apparatus according to a seventh illustrative embodiment.

A seventh illustrative embodiment is described with reference to FIG. 17. FIG. 17 is a plan view illustrating a portion of an image forming apparatus according to the seventh illustrative embodiment.

The image forming apparatus includes a carriage-scan support member 301 as with the sixth illustrative embodiment. A rear side of the carriage-scan support member 301 is mounted on side plates 102A and 102B that partly form a body frame member of the image forming apparatus, via vibration absorbers 11.

Figure 18:
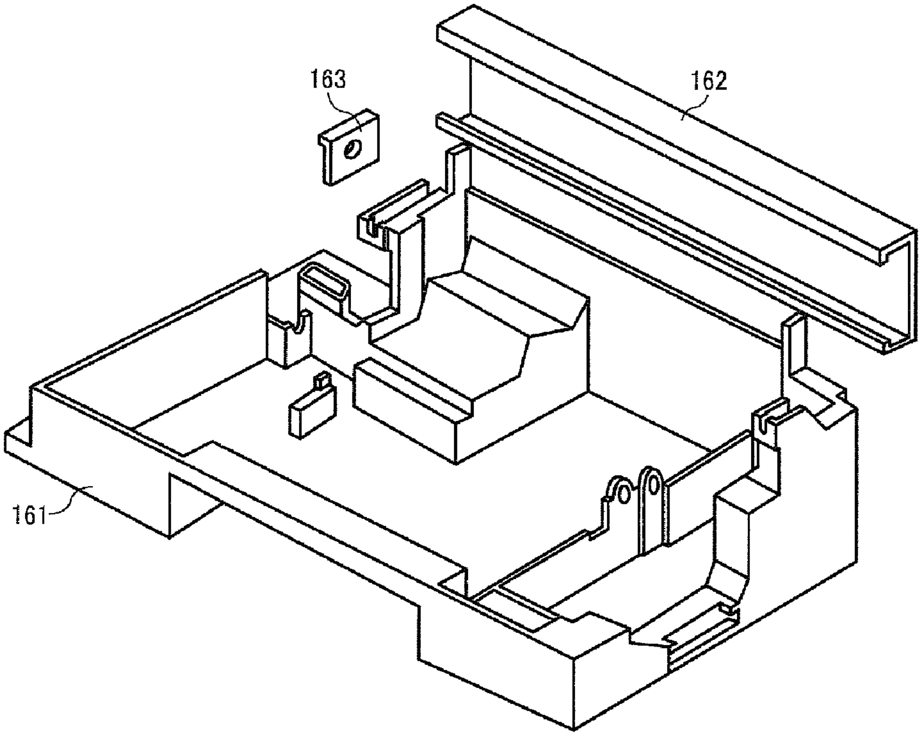
FIG. 18 is an exploded perspective view illustrating an example of the frame configuration of the image forming apparatus according to the seventh illustrative embodiment.

Here, one example of the frame configuration of the image forming apparatus according to the present illustrative embodiment is described using an exploded perspective view shown in FIG. 18.

In FIG. 18, the body frame consists of an integral frame 161 made of integrally molded resin, a rear stay 162, and a driving side-plate 163. The rear stay 162 used as the carriage-scan support member 301 is mounted on the integral frame 161 via vibration absorbers 11.

Figure 19:
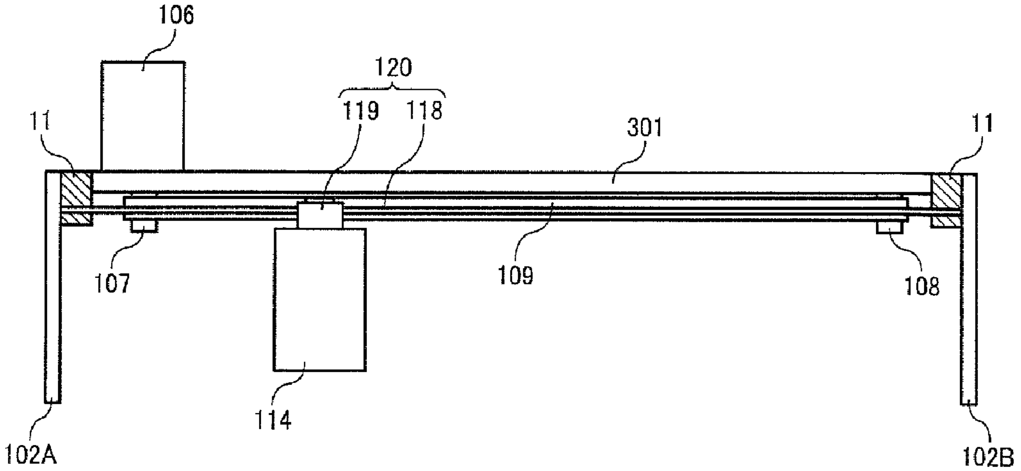
FIG. 19 is a schematic plan view illustrating a portion of an image forming apparatus according to an eighth illustrative embodiment.

Next, an eighth illustrative embodiment is described with reference to FIG. 19. FIG. 19 is a plan view illustrating a portion of an image forming apparatus according to the eighth illustrative embodiment.

In addition to the configuration of the sixth illustrated embodiment illustrated in FIGS. 14 and 15, the image forming apparatus according to the present illustrative embodiment includes an encoder sheet 118 partly forming an encoder 120 to detect a position and speed of a carriage 114. The encoder sheet 118 is held between side plates 102A and 102B forming a body frame member of the image forming apparatus.

Such a configuration prevents reduced accuracy of the position control of the carriage 114, thereby preventing deterioration of image quality.

The position of the carriage 114 is feedback-controlled by an encoder sensor 119 of the carriage 114 (as illustrated in FIG. 10) reading the encoder sheet 118. In this case, if the encoder sheet 118 is held by the carriage-scan support member 301, the encoder sheet 118 might vibrate relative to the body frame member, resulting in reduced accuracy of the position control of the carriage 114 and a deteriorated image quality. Hence, in the present illustrative embodiment, the encoder sheet 118 is held by the body frame member (the side plates 102A and 102B). Such a configuration prevents vibration of the encoder sheet 118, thereby preventing reduced accuracy of the position control of the carriage and a deteriorated image quality.

Figure 20:
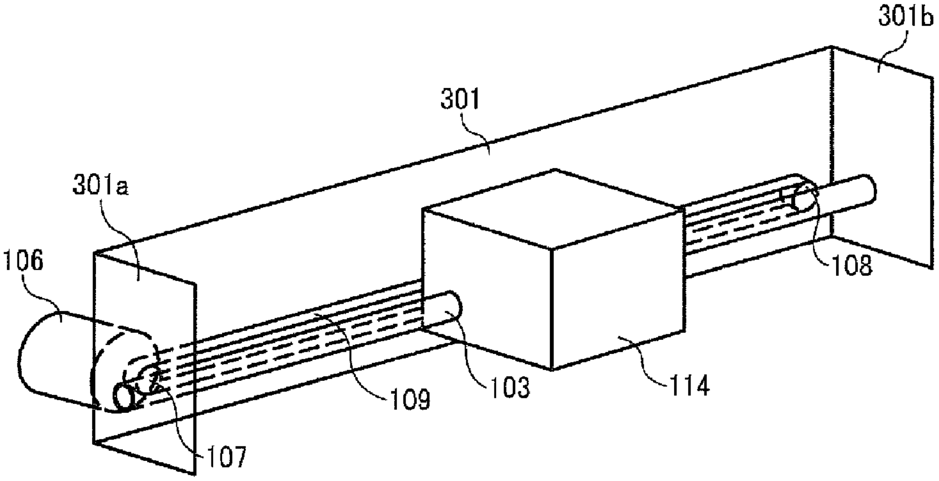
FIG. 20 is a schematic perspective view illustrating a portion of an image forming apparatus according to a ninth illustrative embodiment.

Next, a ninth illustrative embodiment is described with reference to FIG. 20. FIG. 20 is a perspective view illustrating a portion of an image forming apparatus according to the ninth illustrative embodiment.

In addition to the configuration of the sixth illustrative embodiment illustrated in FIGS. 14 and 15, the image forming apparatus according to the present illustrative embodiment includes a main guide rod 103 serving as a guide member to slidably support the carriage 114. The main guide rod 103 is held between side-plate portions 301*a* and 301*b*.

Such a configuration can suppress transmission of vibration caused by reciprocal movement of the carriage 114 to a body frame member of the image forming apparatus.

The carriage 114 slides reciprocally back and forth along the main guide rod 103. If the sliding load between the carriage 114 and the main guide rod 103 is relatively large, vibration caused by the inertial force of the carriage 114 in acceleration and deceleration might be transmitted to the body frame member of the image forming apparatus via the main guide rod 103. Hence, in the present illustrative embodiment, the guide member, such as the main guide rod, supporting the carriage, is held by the carriage-scan support member, thus reducing the vibration transmitted to the body frame member via the guide member.

Figure 21:
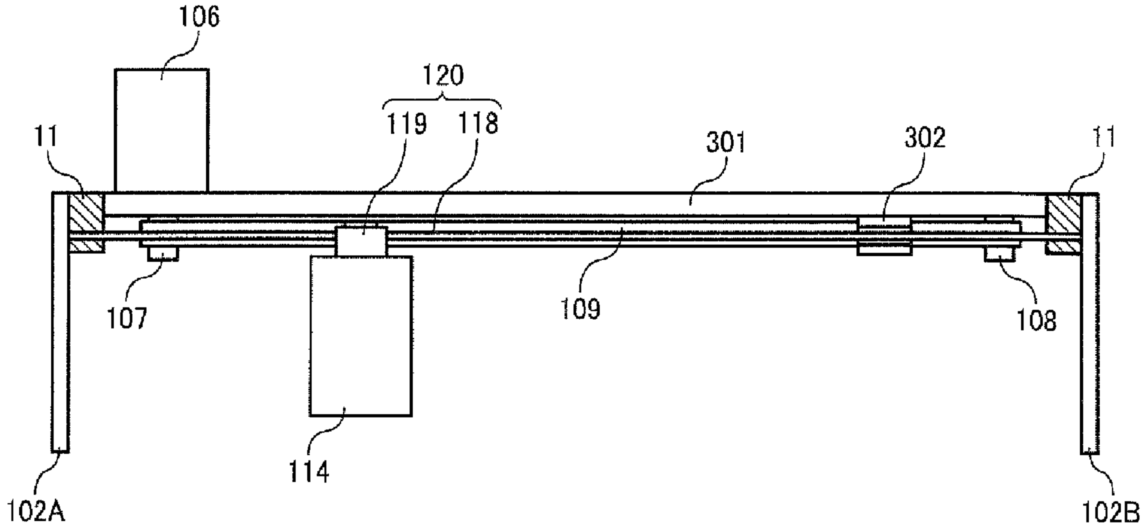
FIG. 21 is a schematic plan view illustrating a portion of an image forming apparatus according to a tenth illustrative embodiment.

Next, a tenth illustrative embodiment is described with reference to FIG. 21. FIG. 21 is a plan view illustrating a portion of an image forming apparatus according to the tenth illustrative embodiment.

In addition to the configuration of the ninth illustrative embodiment, the image forming apparatus according to the present illustrative embodiment includes a sensor 302 serving as a detector to detect a positional displacement of a carriage-scan support member 301 relative to a body frame member of the image forming apparatus. The sensor 302 is mounted on the carriage-scan support member 301.

Such a configuration provides, for example, an enhanced accuracy in the speed of the carriage 114 detected with an encoder 120.

As described above, the scanning operation of the carriage 114 is controlled by the encoder 120. In such a case, the scanning operation may be controlled by detecting either the position or the speed of the carriage 114. When the scanning operation of the carriage 114 is controlled by detecting the speed of the carriage 114, a displacement (vibration) of the carriage-scan support member 301 relative to the body frame member may cause a displacement of the carriage 114 relative to a sheet. Hence, in the present illustrative embodiment, the relative displacement between the body frame member and the carriage-scan support member 301 is detected and the amount of displacement is fed back to the carriage-scan control to correct positional displacement of the carriage relative to the sheet, thus preventing deterioration of a resultant image.

As described above, the encoder sheet 118 mounted on the body frame member is used to detect a relative position between the body frame member and the carriage-scan support member 301, providing a relatively simple configuration and eliminating or mitigating cost increase.

Further, the image forming apparatus controls the vibration absorption characteristics of the vibration absorbers 11 in response to the amount of displacement of the carriage-scan support member 301 obtained by detecting the relative position between the body frame member and the carriage-scan support member 301. By adjusting the vibration absorption characteristics as appropriate, the relative positions of the body frame member and the carriage-scan support member 301 are kept constant, thus further reliably preventing deterioration in a resultant image.

In the above-described illustrative embodiments, the image forming apparatus is described as a printer. However, it is to be noted that the image forming apparatus is not limited to the printer and may be another type of image forming apparatus employing a recording liquid other than ink, a fixing solution, or the like.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the scope of the present invention, and all such modifications are intended to be included within the scope of the present invention.

For example, elements and/or features of different illustrative embodiments may be combined with each other and/or substituted for each other within the scope of this disclosure and appended claims.

What is claimed is:

1. An image forming apparatus, comprising:

a print mechanism section including a reciprocally movable carriage to move in a main scan direction and an image forming unit mounted on the carriage, the image forming unit including a recording head configured to eject droplets to form an image when the carriage moves at a constant speed;

a base member;

a vibration absorber attached to the base member and having electronically controllable vibration reduction characteristics to reduce vibration, the print mechanism section being supported on the base member via the vibration absorber; and a controller to retrieve speed profile data of the carriage from a storage unit, and electronically control the vibration reduction characteristics of the vibration absorber to reduce vibration of the image forming apparatus, based on the retrieved speed profile data and a detected speed of the carriage, wherein in a case that the controller determines that the carriage is accelerating or decelerating, based on the speed profile data and the detected speed, the controller electronically controls the vibration absorber to perform a vibration absorption function, and in a case that the controller determines that the carriage is moving at a constant speed, based on the speed profile data and the detected speed, the controller electronically controls the vibration absorber to (i) deactivate the vibration absorption function, and (ii) fixedly support the print mechanism section on the base member.

2. The image forming apparatus according to claim 1, wherein the image forming unit further comprises a tank that accommodates ink supplied to the recording head mounted on the carriage, and the controller electronically controls the vibration reduction characteristics of the vibration absorber in response to a remaining amount of ink in the tank.

3. The image forming apparatus according to claim 1, further comprising:

a guide member to support the carriage reciprocally movable in the main scan direction;

a guide-support member to which the guide member is mounted; and a frame member of the image forming apparatus, wherein the vibration absorber is provided between the guide-support member and the frame member.

4. The image forming apparatus according to claim 1, further comprising:

a body including the carriage;

an image reading device disposed on the body; and a support portion to support the image reading device, wherein the vibration absorber is provided between the support portion and the body.

5. The image forming apparatus according to claim 1, further comprising:

a carriage driving unit to move the carriage reciprocally; and a carriage-scan support member to hold the carriage driving unit, wherein the vibration absorber is provided between the carriage-scan support member and a frame member of the image forming apparatus.

6. The image forming apparatus according to claim 5, further comprising a guide member to support the carriage reciprocally movable in the main scan direction, wherein the guide member is held by the carriage-scan support member.

7. The image forming apparatus according to claim 5, further comprising an encoder sheet to detect a position of the carriage, wherein the encoder sheet is held by the frame member of the image forming apparatus.

8. The image forming apparatus according to claim 1, wherein in a case that the controller determines that the carriage is accelerating or decelerating, based on the speed profile data and the detected speed, then the controller electronically controls a pump of the vibration absorber to force a pressurized fluid into an elastic member of the vibration absorber, and the elastic member of the vibration absorber supports the print mechanism section, when the pressurized fluid enters the elastic member of the vibration absorber.

9. The image forming apparatus according to claim 1, wherein in a case that the controller determines that the carriage is moving at a constant speed, based on the speed profile data and the detected speed, then the controller electronically controls a pump of the vibration absorber to force a pressurized fluid out of an interior portion of the vibration absorber, and wherein the vibration absorber includes a fixed stopper part that supports the print mechanism section on the base member in a fixed manner, when the pressurized fluid exits the interior portion of the vibration absorber.

10. The image forming apparatus according to claim 1, wherein in a case that the controller determines that the carriage is accelerating or decelerating, based on the speed profile data and the detected speed, then the controller electronically controls an electromagnet of the vibration absorber to repel a second magnet of the vibration absorber and cause the second magnet to move in a predetermined direction, and wherein the second magnet supports the print mechanism section, when the electromagnet repels the second magnet.

11. The image forming apparatus according to claim 1, wherein in a case that the controller determines that the carriage is moving at a constant speed, based on the speed profile data and the detected speed, then the controller electronically controls an electromagnet of the vibration absorber to attract a second magnet of the vibration absorber and cause the second magnet to move in a second predetermined direction, wherein the vibration absorber includes a fixed stopper part that supports the print mechanism section on the base member in a fixed manner, when the electromagnet attracts the second magnet.

12. The image forming apparatus according to claim 2, wherein in a case that the controller determines that the remaining amount of ink in the tank is less than a predetermined value, then the controller electronically deactivates the vibration absorber.

13. The image forming apparatus according to claim 2, wherein in a case that the controller (a) determines that the remaining amount of ink in the tank is equal to or greater than a predetermined value, and (b) determines that the carriage is accelerating or decelerating, based on the speed profile data and the detected speed, then the controller electronically activates the vibration absorber.

14. The image forming apparatus according to claim 2, wherein in a case that the controller (a) determines that the remaining amount of ink in the tank is equal to or greater than a predetermined value, and (b) determines that the carriage is moving at a constant speed, based on the speed profile data and the detected speed, then the controller electronically deactivates the vibration absorber.

15. The image forming apparatus according to claim 1, wherein when the controller determines that the carriage is moving at a constant speed and the controller electronically deactivates the vibration absorption function of the vibration absorber, a fixed stopper part of the vibration absorber supports the print mechanism section in a fixed and stationary position with respect to the base member.

16. The image forming apparatus according to claim 1, wherein the image forming unit includes a tank that accommodates ink supplied to the recording head mounted on the carriage, and the controller determines a remaining amount of ink in the tank, and determines, based on the remaining amount of ink in the tank, that it is necessary to electronically control the vibration reduction characteristics of the vibration absorber to reduce vibration of the image forming apparatus.

17. The image forming apparatus according to claim 16, wherein in a case that the controller determines that the remaining amount of ink in the tank is equal to or greater than a predetermined value, then the controller determines that it is necessary to electronically control the vibration reduction characteristics of the vibration absorber to reduce vibration of the image forming apparatus, and wherein in a case that the controller determines that the remaining amount of ink in the tank is less than a predetermined value, then the controller determines that it is not necessary to electronically control the vibration reduction characteristics of the vibration absorber, and the controller electronically deactivates the vibration absorber.

18. The image forming apparatus according to claim 1, wherein the controller determines, based on a print mode of the image forming apparatus, that it is necessary to electronically control the vibration reduction characteristics of the vibration absorber to reduce vibration of the image forming apparatus.

19. The image forming apparatus according to claim 18, wherein in a case that the print mode of the image forming apparatus is a normal quality print mode, the controller determines that it is necessary to electronically control the vibration reduction characteristics of the vibration absorber to reduce vibration of the image forming apparatus, and in case that the print mode of the image forming apparatus is a high quality print mode, the controller determines that it is not necessary to electronically control the vibration reduction characteristics of the vibration absorber, and the controller electronically deactivates the vibration absorber.

* * * * *